US012722982B2

(12) United States Patent
Park et al.

(10) Patent No.: US 12,722,982 B2
(45) Date of Patent: Sep. 1, 2026

(54) CATHODE ACTIVE MATERIAL FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Sang Min Park, Daejeon (KR); Hee Jun Kweon, Daejeon (KR); Myoung Lae Kim, Daejeon (KR); Sang Bok Kim, Daejeon (KR); Jung Moon Sung, Daejeon (KR); Keum Jung Yoon, Daejeon (KR); Tae Kyoung Lee, Daejeon (KR); Ji Hoon Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 694 days.

(21) Appl. No.: 18/098,697

(22) Filed: Jan. 19, 2023

(65) Prior Publication Data

US 2023/0238526 A1 Jul. 27, 2023

(30) Foreign Application Priority Data

Jan. 26, 2022 (KR) ........................ 10-2022-0011665

(51) Int. Cl.

| | |
|---|---|
| ***H01M 4/525*** | (2010.01) |
| ***H01M 4/02*** | (2006.01) |
| ***H01M 4/505*** | (2010.01) |
| ***H01M 10/052*** | (2010.01) |

(52) U.S. Cl.

CPC ........... *H01M 4/525* (2013.01); *H01M 4/505* (2013.01); *H01M 10/052* (2013.01); *H01M 2004/028* (2013.01)

(58) Field of Classification Search

CPC .................................................... H01M 4/525

See application file for complete search history.

(56) References Cited

U.S. PATENT DOCUMENTS

| | | | | |
|---|---|---|---|---|
| 2022/0112094 | A1 * | 4/2022 | Xiao | H01M 4/131 |
| 2022/0293913 | A1 * | 9/2022 | Yun | H01M 4/364 |

FOREIGN PATENT DOCUMENTS

| | | |
|---|---|---|
| JP | 2020-123441 A | 8/2020 |
| KR | 10-0821523 B1 | 4/2008 |

OTHER PUBLICATIONS

Xu et al., Highly Stabilized Ni-Rich Cathode Material with Mo Induced Epitaxially Grown Nanostructured Hybrid Surface for High-Performance Lithium-Ion Batteries, Applied Materials & Interfaces, Apr. 19, 2019, p. 16629-16638, ACS Publications.

(Continued)

*Primary Examiner* — Brian R Ohara

(74) *Attorney, Agent, or Firm* — IP&T GROUP LLP

(57) ABSTRACT

A cathode active material for a lithium secondary battery according to an embodiment of the present invention includes a plurality of a lithium-transition metal composite oxide particle having a shape of a secondary particle in which a plurality of primary particles are aggregated. The lithium-transition metal composite oxide particle includes a lithium-molybdenum-containing portion having a hexagonal close-packed structure formed between the primary particles.

14 Claims, 5 Drawing Sheets

(56) References Cited

OTHER PUBLICATIONS

Kwak et al., Li2MoO4 coated Ni-rich cathode for all-solid-state batteries, Thin Solid Films, 660, Apr. 25, 2018, pp. 625-630.
Huang et al., Enhanced electrochemical performance of LiNl0.8Co0.1Mn0.1O2 by surface modification with lithium-active MoO3, Journal of Electroanalytical Chemistry, 823, Jun. 20, 2018, pp. 359-367.
Yu et al., Inhibition of excessive SEI-forming and improvement of structure stability for LiNi0.8Co0.1Mn0.1O2 by Li2MoO4 coating, Ionics, 27, May 17, 2021, pp. 2867-2876, Springer.
Ren et al., Facile synthesis of Li2MoO4 coated LiNi1/3Co1/3Mn1/3O2 composite as a novel cathode for high-temperature lithium batteries, Ionics, 26, Feb. 3, 2020, pp. 1617-1627, Springer.
Chen et al., Enhanced structurally stable cathodes by surface and grain boundary tailoring of Ni-Rich material with molybdenum trioxide, Journal of Power Sources, 478, Oct. 19, 2020, pp. 1-9.
Extended European Search Report on the European Patent Application No. 23152756.5 issued by the European Patent Office on Jul. 7, 2023.
Office Action for Korean Patent Application No. 10-2022-0011665 issued by the Korean Patent Office on Nov. 25, 2025.

* cited by examiner 160
140
110
105
110
100
120
125
120
130

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2022-0011665 filed on Jan. 26, 2022 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium-transition metal composite oxide may be used as a cathode active material for the lithium secondary battery. The lithium-transition metal composite oxide may include, e.g., a nickel-based lithium metal oxide.

As an application range of the lithium secondary batteries is being expanded, higher capacity and longer life-span are required while maintaining operational stability. However, non-uniformity in a chemical structure in the lithium-transition metal composite oxide may be caused due to a lithium precipitation, etc. In this case, capacity and/or life-span of the lithium secondary battery may be deteriorated. Further, structural deformation or damages of the lithium-transition metal composite oxide may be caused during repeated charging and discharging to degrade life-span stability and capacity retention.

For example, Korean Registered Patent Publication No. 10-0821523 discloses a method of removing lithium salt impurities by washing the lithium-transition metal composite oxide with water. However, the impurities may not be sufficiently removed and damages of a particle surface may be caused by water during the washing.

SUMMARY

According to an aspect of the present invention, there is provided a cathode active material for a lithium secondary battery having improved operational stability and electrochemical properties, and a method of preparing the same.

According to an aspect of the present invention, there is provided a lithium secondary battery having improved operational stability and electrochemical properties.

A cathode active material for a lithium secondary battery includes a plurality of a lithium-transition metal composite oxide particle having a shape of a secondary particle in which primary particles are aggregated. The lithium-transition metal composite oxide particle includes a lithium-molybdenum-containing portion having a hexagonal close-packed structure formed between the primary particles.

In some embodiments, the primary particles may have a hexagonal close-packed structure.

In some embodiments, the lithium-transition metal composite oxide particle may not include primary particles having a face centered cubic structure.

In some embodiments, a content of molybdenum in the lithium-transition metal composite oxide particle measured through an inductively coupled plasma (ICP) analysis may be in a range from 1,000 ppm to 14,000 ppm based on a total weight of the lithium-transition metal composite oxide particle.

In some embodiments, wherein the content of molybdenum in the lithium-transition metal composite oxide particle measured through the ICP analysis may be in a range from 1,200 ppm to 7,000 ppm based on the total weight of the lithium-transition metal composite oxide particle.

In some embodiments, a carbon content remaining on an outer surface of the lithium-transition metal composite oxide particle and between the primary particles measured by a CS (carbon-sulfur) analyzer may be 1,200 ppm or less.

In some embodiments, the lithium-molybdenum-containing portion may be present on an outer surface of the lithium-transition metal composite oxide particle and between the primary particles within an inner region of the secondary particle.

A lithium secondary battery includes a cathode including a cathode active material layer that includes the cathode active material for a lithium secondary battery according to the above-described embodiments; and an anode facing the cathode.

Ina method of preparing a cathode active material, preliminary lithium-transition metal composite oxide particles each having a shape of a secondary particle in which a plurality of primary particles are aggregated is prepared. The preliminary lithium-transition metal composite oxide particles are mixed with a molybdenum compound aqueous solution. The mixed preliminary lithium-transition metal composite oxide particles and the molybdenum compound aqueous solution are heat-treated to form lithium-transition metal composite oxide particles comprising a lithium-molybdenum containing portion formed between the primary particles. The lithium-molybdenum containing portion has a hexagonal close-packed structure.

In some embodiments, the molybdenum compound aqueous solution may include an ammonium molybdenum-based compound represented by Chemical Formula 2.

$$(NH_4)_aMo_bA_c \quad \text{[Chemical Formula 2]}$$

In Chemical Formula 2, A represents O or S, $2 \leq a \leq 10$, $1 \leq b \leq 10$, and $4 \leq c \leq 30$.

In some embodiments, the ammonium molybdenum-based compound may include at least one of ammonium orthomolybdate ($(NH_4)_2MoO_4$), ammonium heptamolybdate ($(NH_4)_6Mo_7O_{24}$) and ammonium tetrathiomolybdate ($(NH_4)_2MoS_4$).

In some embodiments, an input amount of the ammonium molybdenum-based compound may be in a range from 0.4 wt % to 2.5 wt % based on a total weight of the preliminary lithium-transition metal composite oxide particles.

In some embodiments, an amount of a solvent in the molybdenum compound aqueous solution may be in a range from 2 wt % to 20 wt % based on a total weight of the preliminary lithium-transition metal composite oxide particles.

In some embodiments, the heat-treating may be performed at a temperature ranging from 200° C. to 400° C. under an oxygen atmosphere.

In some embodiments, the preliminary lithium-transition metal composite oxide particles may be mixed with the molybdenum compound aqueous solution without a water-washing treatment.

A cathode active material according to embodiments of the present invention may include a lithium-transition metal composite oxide particle including a plurality of primary particles and a lithium-molybdenum-containing portion formed between the primary particles. Accordingly, surfaces of the primary particles may be protected from, e.g., an impregnating electrolyte by the lithium-molybdenum containing portion. Thus, side reactions between the primary particles may be suppressed, and life-span properties and driving stability of the lithium secondary battery may be improved.

In exemplary embodiments, the lithium-molybdenum-containing portion may have a hexagonal close-packed structure. Accordingly, particle structures of the primary particle and the lithium-molybdenum-containing portion in the lithium-transition metal composite oxide particle may be substantially identical. Thus, a resistance generated at a particle interface during movement of lithium ions may be reduced.

In a method for preparing the cathode active material of the present invention, an aqueous molybdenum compound solution may be mixed with preliminary lithium-transition metal composite oxide particles without a water washing treatment. An amount of a solvent in the aqueous molybdenum compound solution may be in a range from 2 wt % to 20 wt % based on a total weight of the preliminary lithium-transition metal composite oxide particles (an initial wetting method).

Accordingly, the primary particles of the lithium-transition metal composite oxide particles may be prevented from being transformed from the hexagonal close-packed structure to a face-centered cubic structure during the water washing treatment. Thus, deterioration of an initial capacity and the life-span properties of the lithium secondary battery may be prevented. Additionally, a residual lithium located between an outer surface of the lithium-transition metal composite oxide particles and the primary particles may be removed, so that deterioration of the life-span properties due to a gas generation may be prevented. Further, a battery resistance may be reduced and the initial capacity may be improved.

DETAILED DESCRIPTION OF THE EMBODIMENTS

Figure 1:
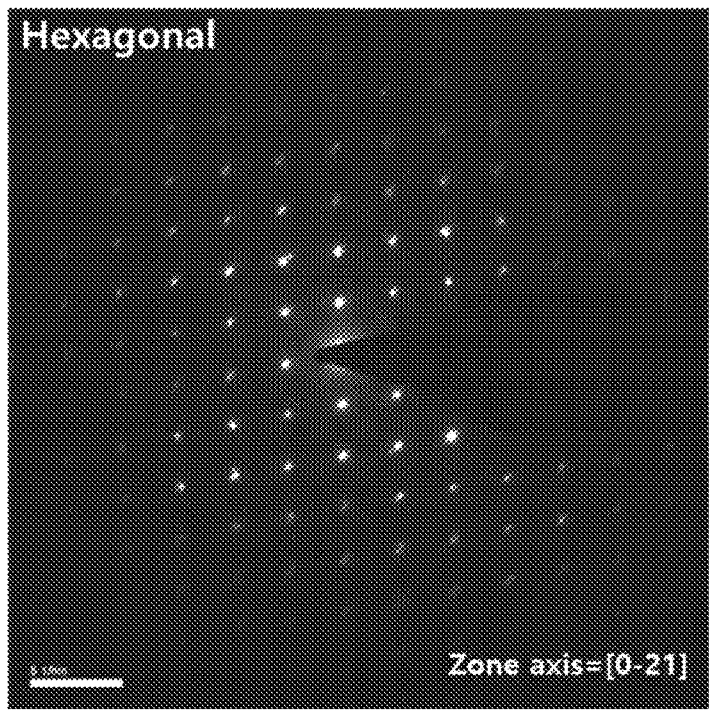
FIG. 1 is an FFT (Fast Fourier Transform) image of a primary particle region in accordance with exemplary embodiments.

According to embodiments of the present invention, a cathode active material for a lithium secondary battery (hereinafter, abbreviated as a cathode active material) including a lithium-transition metal composite oxide particle and a lithium secondary battery (hereinafter, abbreviated as a secondary battery) including the cathode active material are provided.

Hereinafter, embodiments of the present invention will be described in detail with reference to exemplary embodiments and the accompanying drawings. However, those skilled in the art will appreciate that such embodiments and drawings are provided to further understand the spirit of the present invention and do not limit subject matters to be protected as disclosed in the detailed description and appended claims.

The cathode active material includes a lithium-transition metal composite oxide particle having a shape of a secondary particle in which a plurality of primary particles are aggregated.

The cathode active material may include a plurality of the lithium-transition metal composite oxide particles. For example, an amount of the lithium-transition metal composite oxide particles may be 50 weight percent (wt %) or more based on a total weight of the cathode active material. Preferably, the amount of the lithium-transition metal composite oxide particles may be 60 wt % or more, 70 wt % or more, 80 wt % or more, or 90 wt % or more, based on the total weight of the cathode active material.

In an embodiment, the cathode active material may substantially consist of the lithium-transition metal composite oxide particles.

The lithium-transition metal composite oxide particle includes a lithium-molybdenum (Li—Mo) containing portion formed between the primary particles. Accordingly, surfaces of the primary particles may be protected from an impregnating electrolyte, etc., by the lithium-molybdenum containing portion. Thus, side reactions between the primary particles may be suppressed, and life-span properties and driving stability of the secondary battery may be improved.

The term "between primary particles" as used herein may refer to a region between the primary particles within an inner region of the secondary particle.

For example, the lithium-molybdenum-containing portion may be formed by reacting a residual lithium existing between the primary particles with an ammonium molybdenum-based compound. Thus, the residual lithium present on a surface or at an inside of the lithium-transition metal composite oxide particle may be sufficiently removed to improve the life-span properties of the secondary battery.

In an embodiment, the lithium-molybdenum containing portion may include at least one of $MoO_3$, $Li_4Mo_5O_{17}$ and $Li_2MoO_4$. $Li_2MoO_4$ has a P32 trigonal structure, and a lithium ion migration from the surface of the lithium-transition metal composite oxide particle having a hexagonal close-packed structure to the lithium-molybdenum containing portion may be promoted. Thus, conductivity and power of the secondary battery may be enhanced.

In some embodiments, the lithium-molybdenum-containing portion may also be present on an outer surface of the lithium-transition metal composite oxide particle. Accordingly, the lithium-molybdenum-containing portion may protect both the outer surface of the secondary particle formed by the aggregation of the primary particles and the inner region between the primary particles. Thus, the side reaction with the electrolyte may be further suppressed, and the life-span properties and driving stability of the secondary battery may be improved.

In some embodiments, the primary particle may have a single-crystal or poly-crystal structure from a crystallographic aspect.

For example, the primary particle may include nickel (Ni) and may further include at least one of cobalt (Co) and manganese (Mn).

For example, the primary particle may be represented by Chemical Formula 1 below.

$$Li_xNi_yM_{1-y}O_{2+z} \quad \text{[Chemical Formula 1]}$$

In Chemical Formula 1, $0.9 \le x \le 1.2$, $0.5 \le y \le 0.99$, and $-0.1 \le z \le 0.1$. M represents at least one element selected from Na, Mg, Ca, Y, Ti, Hf, V, Nb, Ta, Cr, Mo, W, Mn, Co, Fe, Cu, Ag, Zn, B, Al, Ga, C, Si, Sn, Ba and Zr.

In some preferable embodiments, a molar ratio or a concentration of Ni denoted as y in Chemical Formula 1 may be 0.8 or more.

For example, if a high-Ni composition in which y is greater than or equal to 0.8 is employed, a calcination of the lithium-transition metal composite oxide particles may be performed at a relatively low temperature. In this case, an amount of a residual lithium generated on a surface of the lithium-transition metal composite oxide particle may be increased. Accordingly, a water washing process or a non-water washing process (e.g., an initial wetting method) may be performed to remove the residual lithium. Thus, when y is greater than or equal to 0.8, the process for removing the residual lithium may be substantially practical.

Ni may serve as a transition metal related to power and capacity of a lithium secondary battery. Thus, as described above, a high-power cathode and a high-power lithium secondary battery may be provided by employing the high-Ni composition in the lithium-transition metal composite oxide particle.

However, as the content of Ni increases, long-term storage stability and life-span stability of the cathode or secondary battery may be relatively degraded. In exemplary embodiments, life-span stability and capacity retention may be improved through Mn while maintaining electrical conductivity by including Co.

Figure 2:
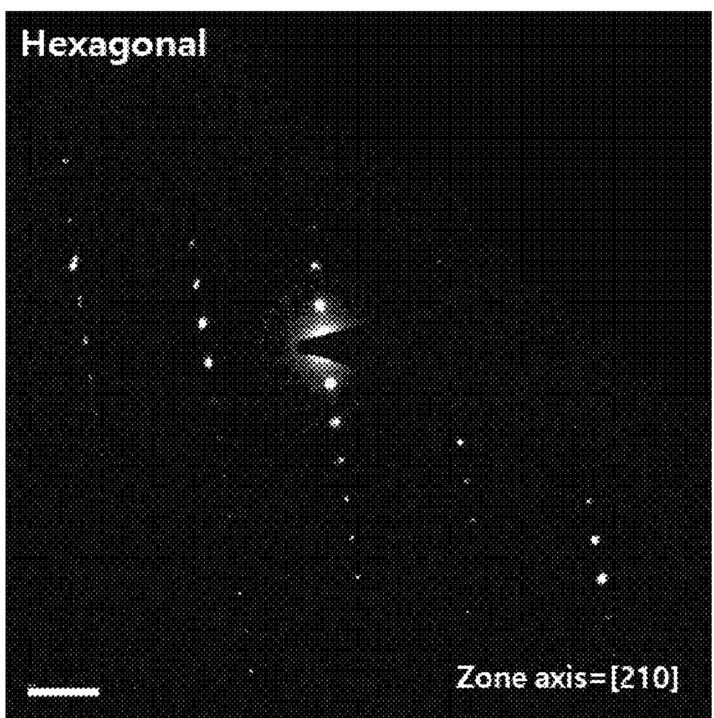
FIG. 2 is an FFT image of a region (e.g., a lithium-molybdenum containing portion) between primary particles in accordance with exemplary embodiments.

FIG. 1 is an FFT (Fast Fourier Transform) image of a primary particle region in accordance with exemplary embodiments. FIG. 2 is an FFT image of a region (e.g., a lithium-molybdenum containing portion) between primary particles in accordance with exemplary embodiments.

Referring to FIGS. 1 and 2, in some embodiments, the primary particles of the lithium-transition metal composite oxide particles may have a hexagonal close-packed structure. Accordingly, a large amount of lithium elements and transition metal elements may have a stable layered structure to be included even in a small space, so that capacity and life-span properties of the secondary battery may be improved.

The lithium-molybdenum-containing portion has a hexagonal close-packed structure. Accordingly, the particle structure of the primary particle and the lithium-molybdenum-containing portion in the lithium-transition metal composite oxide particle may be substantially the same. Thus, a resistance generated at a particle interface during the movement of lithium ions may be reduced.

When the lithium-molybdenum-containing portion does not have a hexagonal close-packed structure, the resistance may increase at the particle interface as the lithium is transferred through different particle structures. Accordingly, power and capacity properties of the secondary battery may be deteriorated.

In some embodiments, a content of molybdenum of the lithium-transition metal composite oxide particle measured by an Inductively coupled Plasma (ICP) analysis may be in a range from 1,000 ppm to 14,000 ppm based on the total weight of the lithium-transition metal composite oxide particle, preferably, from 1,200 ppm to 7,000 ppm. Within this range, deterioration of the capacity and life-span properties due to an excessive molybdenum content may be prevented while sufficiently removing the residual lithium. Thus, the capacity retention of the secondary battery may be improved while maintaining or improving power properties.

In some embodiments, a content of carbon remaining at an outer surface and the region between primary particles of the lithium-transition metal composite oxide particle measured through carbon-sulfur analyzer (CS analyzer) may be 1,500 ppm or less based on the total weight of the lithium-transition metal composite oxide particle, preferably 1,200 ppm or less. Within this range, resistance during lithium ion movement may be reduced and side reactions with electrolyte may be suppressed. Thus, an initial capacity properties and output properties may be improved, and life-span properties during repeated charging and discharging may be improved.

In some embodiments, during a pH titration for measuring the residual lithium, an input amount of HCl may be reduced compared to the case where the lithium-molybdenum containing part is not formed. Accordingly, the residual lithium in the cathode active material may be decreased. Accordingly, gas generation may be reduced by suppressing an electrolyte decomposition caused by the residual lithium, and the life-span properties of the lithium secondary battery may be improved.

Figure 3:
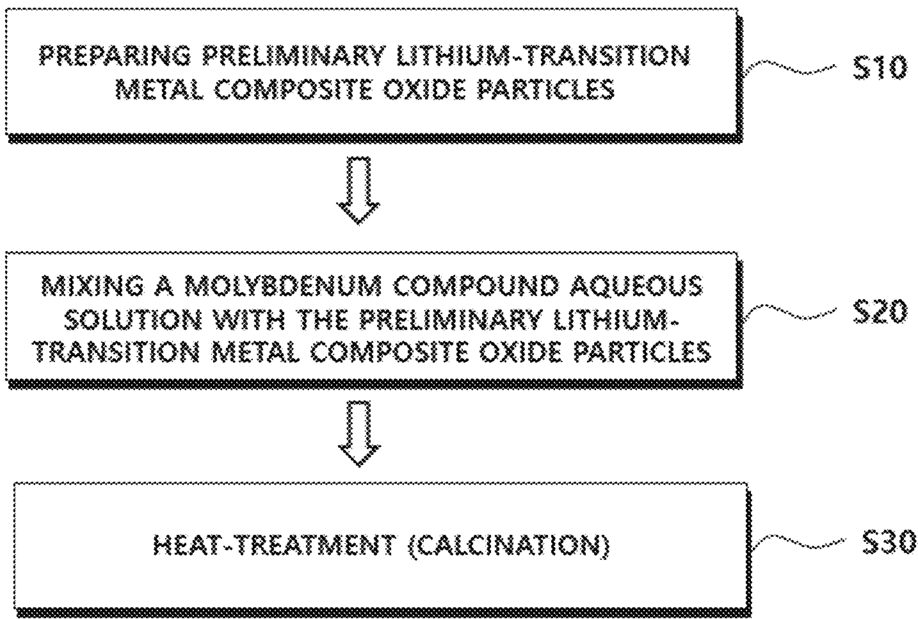
FIG. 3 is a process flow diagram illustrating a method of preparing a cathode active material in accordance with exemplary embodiments.

FIG. 3 is a process flow diagram illustrating a method of preparing a cathode active material in accordance with exemplary embodiments.

Referring to FIG. 3, preliminary lithium-transition metal composite oxide particles having a shape of secondary particles in which a plurality of primary particles are aggregated may be prepared (e.g., in an operation S10).

For example, the preliminary lithium-transition metal composite oxide particles may be prepared by reacting a transition metal precursor with a lithium precursor. The transition metal precursor (e.g., a Ni—Co—Mn precursor) may be prepared through a co-precipitation reaction.

For example, the transition metal precursors may be prepared through the co-precipitation of metal salts. The metal salts may include a nickel salt, a manganese salt and a cobalt salt.

For example, the nickel salt may include at least one selected from the group consisting of nickel sulfate, nickel hydroxide, nickel nitrate, nickel acetate and a hydrate thereof.

For example, the manganese salt may include at least one selected from the group consisting of manganese sulfate, manganese acetate and a hydrate thereof.

For example, the cobalt salt may include at least one selected from the group consisting of cobalt sulfate, cobalt nitrate, cobalt carbonate and a hydrate thereof.

The metal salts may be mixed with a precipitating agent and/or a chelating agent in a ratio satisfying a content or a concentration ratio of each metal described with reference to Chemical Formula 1 to form an aqueous solution. The transition metal precursor may be prepared by coprecipitating the aqueous solution in a reactor.

The precipitating agent may include an alkaline compound such as sodium hydroxide (NaOH), sodium carbonate ($Na_2CO_3$), etc. The chelating agent may include, e.g., aqueous ammonia (e.g., $NH_3H_2O$), ammonium carbonate (e.g., $NH_3HCO_3$), etc.

A temperature of the co-precipitation reaction may be controlled, e.g., in a range from about 40° C. to 60° C. A reaction time may be adjusted in a range from about 24 hours to 72 hours.

The lithium precursor compound may include, e.g., lithium carbonate, lithium nitrate, lithium acetate, lithium oxide, lithium hydroxide, etc. These may be used alone or in a combination thereof.

In exemplary embodiments, the preliminary lithium-transition metal composite oxide particles and a molybdenum compound aqueous solution may be mixed (e.g., in an operation S20). For example, the molybdenum compound aqueous solution may be added to the preliminary lithium-transition metal composite oxide particles and mixed.

In some embodiments, the molybdenum compound aqueous solution may include an ammonium molybdenum-based compound represented by Chemical Formula 2 below.

$$(NH_4)_aMo_bA_c \quad \text{[Chemical Formula 2]}$$

In Chemical Formula 2, A is oxygen (O) or sulfur (S), and $2 \le a \le 10$, $1 \le b \le 10$, and $4 \le c \le 30$.

The ammonium molybdenum-based compound contains an ammonium group in a chemical structure thereof and may react with lithium to form an intermediate phase (e.g., $Li_x(NH_4) \cdot Mo_bO_c$) having a low activation energy. Accordingly, a reactivity between a molybdenum source and the residual lithium may be enhanced so that the residual lithium may be sufficiently removed.

In some embodiments, the ammonium molybdenum-based compound may include at least one of ammonium orthomolybdate ($(NH_4)_2MoO_4$), ammonium heptamolybdate ($(NH_4)_6Mo_7O_{24}$) and ammonium tetrathiomolybdate ($(NH_4)_2MoS_4$).

In some embodiments, an added amount of the ammonium molybdenum-based compound may be in a range from 0.4 wt % to 2.5 wt % based on a total weight of the preliminary lithium-transition metal composite oxide particles. Within this range, deterioration of the capacity and life-span properties due to an excessive input of the ammonium molybdenum-based compound may be prevented while sufficiently reacting the residual lithium and the ammonium molybdenum-based compound. Thus, the life-span and capacity properties of the cathode active material may be improved.

For example, an amount of the solvent in the molybdenum compound aqueous solution may be in a range from 2 wt % to 20 wt % based on the total weight of the preliminary lithium-transition metal composite oxide particles. Within this range, deformation of the layer structure of the primary particles due to an excessive solvent input may be prevented while sufficiently dissolving the ammonium molybdenum-based compound. Accordingly, the capacity and power properties of the secondary battery may be maintained and/or improved while enhancing the life-span properties of the secondary battery.

In some embodiments, the ammonium molybdenum-based compound in a powder form may be added to a solvent in an amount of 50 wt % or less based on the weight of the solvent to form the molybdenum compound aqueous solution. Within this range, the ammonium molybdenum-based compound powder may be sufficiently dissolved in the solvent while sufficiently reacting the residual lithium and the ammonium molybdenum-based compound to improve processability.

For example, the solvent may be de-ionized water (DIW).

As described above, the preliminary lithium-transition metal composite oxide particles and the molybdenum compound aqueous solution may be mixed. Accordingly, molybdenum contained in the molybdenum compound aqueous solution may react with the residual lithium present on a surface of the preliminary lithium-transition metal composite oxide particle to be converted into the lithium-molybdenum-containing portion. Thus, the lithium-transition metal composite oxide particle including primary particles and the lithium-molybdenum containing portion formed between the primary particles and having a hexagonal close-packed structure may be obtained.

For example, impurities present on the surface of the preliminary lithium-transition metal composite oxide particle may be removed through the mixing process. For example, an excessive amount of the lithium precursor (lithium salt) may be used to improve yield of lithium metal oxide particles or to stabilize a synthesis process. In this case, the lithium precursor including lithium carbonate ($Li_2CO_3$) may remain on the surface of the synthesized preliminary lithium-transition metal composite oxide particle.

Further, for example, a lithium-transition metal composite oxide particle containing a high composition of Ni may be calcined at a lower temperature during a fabrication of a cathode. Accordingly, the content of the residual lithium on the surface of the lithium-transition metal composite oxide particle may be increased.

When the residual lithium is removed by washing with substantially the same amount of water as that of the cathode active material (a washing treatment), the residual lithium may be removed, but an oxidation of the surface of the preliminary lithium-transition metal composite oxide particle and a side reaction with water may occur, thereby causing damages or collapse of the layer structure of the primary particles. Further, as the layered structure is transformed into a face centered cubic structure, a spinel structure and/or a rock salt structure rather than the hexagonal close-packed structure by water, the lithium-nickel-based oxide is hydrolyzed to generate nickel impurities such as NiO or $Ni(OH)_2$.

However, according to exemplary embodiments of the present invention, the mixing process (e.g., an initial wetting method) may be performed using the molybdenum compound aqueous solution without the washing treatment. Thus, passivation by the molybdenum-based compound may be implemented on the surface of the lithium-transition metal composite oxide particle while performing the mixing process. For example, the lithium-molybdenum containing portion containing lithium and molybdenum may be formed between the primary particles having the hexagonal close-packed structure.

The term "initial wetting method" used herein may refer to a method in which water or the molybdenum compound aqueous solution of 20 wt % or less based on the total weight of the lithium-transition metal composite oxide particles is used in, e.g., a spray method.

For example, the "initial wetting method" may exclude the water-washing treatment in which an amount of water substantially equal to or similar to the total weight of the lithium-transition metal composite oxide particles is used and stirred.

For example, the water-washing treatment may not be performed, so that the lithium-transition metal composite oxide particles may not include primary particles having a face-centered cubic structure. Thus, the residual lithium may be effectively removed while preventing the oxidation of the surface of the particle and the layer structure damages by water.

For example, the ammonium molybdenum-based compound powder may be directly mixed with the lithium-transition metal composite oxide particles instead of the molybdenum compound aqueous solution. However, in this case, the ammonium molybdenum-based compound powder may not penetrate into the primary particles due to a lack of a capillary force. Accordingly, most of the ammonium molybdenum-based compound powder may react with the residual lithium on the surface of secondary particles in which the primary particles are aggregated.

For example, the lithium-molybdenum-containing portion may be formed as a coating on the surface of the secondary particle. In this case, the surface of the primary particles may not be sufficiently protected when impregnated with the electrolyte, and the residual lithium may remain on the surface between the primary particles, thereby increasing the battery resistance. Accordingly, the capacity and power properties of the battery may be degraded.

According to exemplary embodiments of the present invention, the initial wetting method may be performed using the molybdenum compound aqueous solution as described above. Thus, the molybdenum compound aqueous solution may permeate between the primary particles by the capillary force. Therefore, the molybdenum compound may react with the residual lithium between the primary particles to form the lithium-molybdenum-containing portion between the primary particles.

After the above-described mixing process, the lithium-transition metal composite oxide particles including the primary particles and the lithium-molybdenum-containing portion may be formed through a heat treatment (calcination) process (e.g., in an operation S30).

For example, the preliminary lithium-transition metal composite oxide particle and the lithium-molybdenum-containing portion formed by the mixing process may be heat-treated using a firing furnace. Accordingly, the lithium-transition metal composite oxide particles in which the lithium-molybdenum-containing portion may be fixed between the primary particles may be obtained.

For example, the heat treatment may be performed at a temperature ranging from 200° C. to 400° C. under an oxygen atmosphere. Within this range, the residual lithium on the surface of the preliminary lithium-transition metal composite oxide particle and the molybdenum-containing compound in the molybdenum compound aqueous solution may be sufficiently reacted to form the lithium-molybdenum-containing portion.

Figures 4, 5:
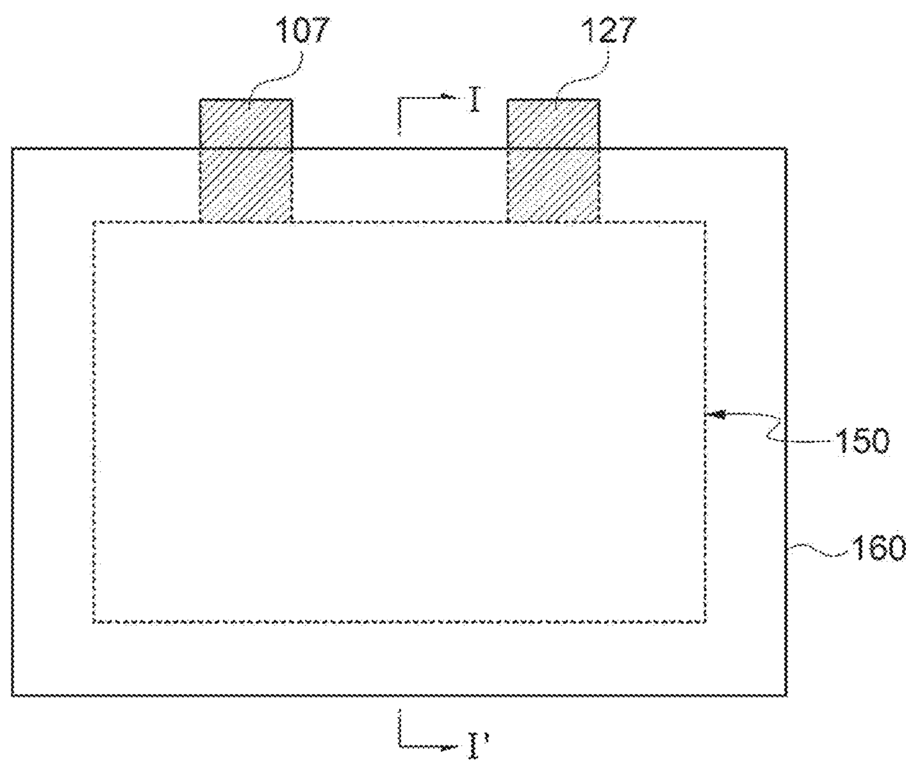
FIGS. 4 and 5 are a schematic plan view and a schematic cross-sectional view, respectively, illustrating a lithium secondary battery in accordance with exemplary embodiments.

FIGS. 4 and 5 are a schematic plan view and a schematic cross-sectional view, respectively, illustrating a lithium secondary battery in accordance with exemplary embodiments. For example, FIG. 5 is a cross-sectional view taken along a line I-I' of FIG. 4 in a thickness direction.

Referring to FIGS. 4 and 5, the lithium secondary battery may include a cathode 100 including the cathode active material including the above-described lithium-molybdenum containing portion, an anode 130 and a separation layer 140.

The cathode 100 may include a cathode active material layer 110 formed by coating the cathode active material including the above-described lithium-transition metal oxide particles on a cathode current collector 105.

For example, the lithium-transition metal composite oxide particles may be mixed and stirred in solvent with a binder, a conductive material, and/or a dispersive agent. The slurry may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material capable of adsorbing and ejecting lithium ions.

For example, a carbon-based material such as a crystalline carbon, an amorphous carbon, a carbon complex or a carbon fiber, a lithium alloy, silicon or tin may be used as the anode active material.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 125 may include, e.g., gold, stainless steel, nickel, aluminum, titanium, copper, or an alloy thereof, and preferably may include copper or a copper alloy.

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those used for the cathode active material layer 110 may be used in the anode 130. In some embodiments, the binder for forming the anode 130 may include an aqueous binder such as styrene-butadiene rubber (SBR) for a compatibility with, e.g., the carbon-based active material, and carboxymethyl cellulose (CMC) may also be used as a thickener.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding of the separation layer 140.

The electrode assembly 150 may be accommodated together with an electrolyte in an outer case 160 to define the lithium secondary battery. In exemplary embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, Br, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 5, electrode tabs (a cathode tab and an anode tab) may protrude from the cathode current collector 105 and the anode current collector 125 included in each electrode cell to one side of the case 160. The electrode tabs may be welded together with the one side of the outer case 160 to be connected to an electrode lead (a cathode lead 107 and an anode lead 127) that may be extended or exposed to an outside of the outer case 160.

The lithium secondary battery may be manufactured in, e.g., a cylindrical shape using a can, a square shape, a pouch shape or a coin shape.

According to exemplary embodiments, the cathode active material having improved chemical stability by doping or coating of the molybdenum-containing compound may be used so that the lithium secondary battery having improved life-span and long-term stability while suppressing a reduction of a capacity and an average voltage.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

Preparation of Preliminary Lithium-Transition Metal Composite Oxide Particles (S10)

$NiSO_4$, $CoSO_4$ and $MnSO_4$ were mixed in a molar ratio of 0.88:0.09:0.03, respectively, using distilled water from which internal dissolved oxygen was removed by bubbling with $N_2$ for 24 hours. The solution was introduced into a reactor at 50° C., and a co-precipitation reaction was performed for 48 hours using NaOH and $NH_3H_2O$ as a precipitating agent and a chelating agent, respectively, to obtain $Ni_{0.88}Co_{0.09}Mn_{0.03}(OH)_2$ as a transition metal precursor. The obtained precursor was dried at 80° C. for 12 hours and then redried at 110° C. for 12 hours.

Lithium hydroxide and the transition metal precursor were added to a dry high-speed mixer in a molar ratio of 1.01:1 and mixed uniformly for 5 minutes. The mixture was put into a firing furnace and heated to a temperature ranging from 710° C. to 750° C. at a heating rate of 2° C./min, and maintained at the temperature of 710° C. to 750° C. for 10 hours. Oxygen was continuously passed at a flow rate of 10 mL/min during the temperature elevation and maintenance. After the firing, natural cooling was performed to room temperature, and preliminary lithium-transition metal composite oxide particles represented by $LiNi_{0.88}Co_{0.09}Mn_{0.03}O_2$ were obtained through pulverization and classification.

Preparation and Mixing of Molybdenum Compound Aqueous Solution (S20) and Heat Treatment (S30)

0.60 wt % of a $(NH_4)_2MoO_4$ powder based on a total weight of the preliminary lithium-transition metal composite oxide particles was added in 10 wt % of de-ionized water (DIW) based on the total weight of the obtained preliminary lithium-transition metal composite oxide particles, and then stirred to prepare a molybdenum compound aqueous solution.

The prepared molybdenum compound aqueous solution was added to the preliminary lithium-transition metal composite oxide particles and mixed.

The mixture was put into a firing furnace and heated to a temperature between 200° C. and 400° C. at a heating rate of 2° C./min while supplying oxygen at a flow rate of 10 mL/min, and maintained at the elevated temperature for 10 hours. After the firing, classification with 325 mesh was performed to prepare lithium-transition metal composite oxide particles.

The prepared lithium-transition metal composite oxide particles were used as a cathode active material.

Fabrication of Lithium Secondary Battery

A lithium secondary battery was fabricated using the prepared cathode active material. Specifically, a cathode mixture was prepared by mixing the cathode active material, Denka Black as a conductive material and PVDF as a binder in a mass ratio of 93:5:2, respectively, and then coated on an aluminum current collector, followed by drying and pressing to obtain the cathode. A target electrode density of the cathode after the pressing was adjusted to 3.0 g/cc.

A lithium metal was used as an anode active material.

The cathode and the anode prepared as described above were notched and laminated in a circular shape having diameters of Φ14 and Φ16, respectively, and a separator (polyethylene, thickness 13 μm) notched with Φ19 was interposed between the cathode and the anode to form an electrode cell. The electrode cell was placed in a coin cell exterior material having a diameter of 20 mm and a height of 1.6 mm, and an electrolyte was injected and assembled, followed by aging for 12 hours or more so that the electrolyte could impregnate the electrode to prepare a lithium secondary battery.

A 1M LiPF6 solution using a mixed solvent of EC/EMC (30/70; volume ratio), and was used as the electrolyte.

Formation charging and discharging was performed on the lithium secondary battery prepared as described above (charging condition CC-CV 0.1 C 4.3V 0.005 C CUT-OFF, discharging condition CC 0.1 C 2.5V CUT-OFF).

Example 2

A cathode active material and a lithium secondary battery by the same method as that in Example 1, except that the molybdenum compound aqueous solution was prepared by adding 1.22 wt % of $(NH_4)_2MoO_4$ powder to pure water based ono the total weight of the preliminary lithium-transition metal composite oxide particles.

Example 3

A cathode active material and a lithium secondary battery by the same method as that in Example 1, except that the molybdenum compound aqueous solution was prepared by adding 1.70 wt % of $(NH_4)_2MoO_4$ powder to pure water based on the total weight of the preliminary lithium-transition metal composite oxide particles.

Example 4

A cathode active material and a lithium secondary battery by the same method as that in Example 1, except that the molybdenum compound aqueous solution was prepared by adding 0.60 wt % of $(NH_4)_6Mo_7O_{24}$ powder to pure water based on the total weight of the preliminary lithium-transition metal composite oxide particles.

Example 5

A cathode active material and a lithium secondary battery by the same method as that in Example 1, except that the molybdenum compound aqueous solution was prepared by adding 1.24 wt % of $(NH_4)_6Mo_7O_{24}$ powder to pure water based on the total weight of the preliminary lithium-transition metal composite oxide particles.

Example 6

A cathode active material and a lithium secondary battery by the same method as that in Example 1, except that the molybdenum compound aqueous solution was prepared by adding 2.57 wt % of $(NH_4)_6Mo_7O_{24}$ powder to pure water based on the total weight of the preliminary lithium-transition metal composite oxide particles.

Example 7

A cathode active material and a lithium secondary battery by the same method as that in Example 1, except that the molybdenum compound aqueous solution was prepared by adding 0.30 wt % of $(NH_4)_2MoS_4$ powder to pure water based on the total weight of the preliminary lithium-transition metal composite oxide particles.

Example 8

A cathode active material and a lithium secondary battery by the same method as that in Example 1, except that the molybdenum compound aqueous solution was prepared by adding 0.80 wt % of $(NH_4)_2MoS_4$ powder to pure water based on the total weight of the preliminary lithium-transition metal composite oxide particles.

Example 9

A cathode active material and a lithium secondary battery by the same method as that in Example 1, except that the molybdenum compound aqueous solution was prepared by adding 1.40 wt % of $(NH_4)_2MoS_4$ powder to pure water based on the total weight of the preliminary lithium-transition metal composite oxide particles.

Example 10

A cathode active material and a lithium secondary battery by the same method as that in Example 1, except that the molybdenum compound aqueous solution was prepared by adding 1.5 wt % of $(NH_4)_2MoO_4$ powder to of pure water based on the total weight of the preliminary lithium-transition metal composite oxide particles.

Example 11

A cathode active material and a lithium secondary battery by the same method as that in Example 1, except that the molybdenum compound aqueous solution was prepared by adding 21 wt % of $(NH_4)_2MoO_4$ powder to pure water based on the total weight of the preliminary lithium-transition metal composite oxide particles.

Comparative Example 1

A cathode active material and a lithium secondary battery by the same method as that in Example 1, except that the preliminary lithium-transition metal composite oxide particles were used as the cathode active material without a post-treatment.

Comparative Example 2

A cathode active material and a lithium secondary battery by the same method as that in Example 1, except that the preliminary lithium-transition metal composite oxide particles were added to 100 wt % of pure water based on the total weight of the preliminary lithium-transition metal composite oxide particles instead of the molybdenum compound aqueous solution, stirred for 10 minutes (a water-washing treatment).

In the above-described Examples, an initial wetting method using a small amount of the solution or water was performed. However, in Comparative Example 2, the water washing treatment using substantially the same amount of water as that of the cathode active material was performed.

Experimental Example 1

(1) Measurement of Molybdenum (Mo) Content

A molybdenum content in the particles was measured by performing an ICP (Inductively Coupled Plasma) analysis on the cathode active materials obtained according to the above-described Examples and Comparative Examples.

(3) Evaluation of Residual Lithium ($Li_2CO_3$) Content

Based on the carbon content measured in the above (2), a content of $Li_2CO_3$ content was evaluated based on Equation 1 below.

$$Li_2CO_3 \text{ content (ppm)} = \text{carbon content (ppm)} \times (MW_{Li2CO3}/MW_C) \quad \text{[Equation 1]}$$

In Equation 1, $MW_{Li2CO3}$ is a molecular weight of $Li_2CO_3$, and $MW_C$ is an atomic weight of carbon.

The input amount of the ammonium molybdenum compound, the process, and the evaluation results of Experimental Example 1 are shown in Table 1 below.

TABLE 1

| No. | process type | input amount of ammonium molybdenum-based compound (wt %) | Mo content (ppm) | C content (ppm) | $Li_2CO_3$ content (ppm) |
|---|---|---|---|---|---|
| Example 1 | initial wetting | 0.60 | 2,937 | 770 | 2,418 |
| Example 2 | initial wetting | 1.22 | 5,820 | 630 | 1,978 |
| Example 3 | initial wetting | 1.70 | 8,321 | 480 | 1,507 |
| Example 4 | initial wetting | 0.60 | 3,260 | 830 | 2,606 |
| Example 5 | initial wetting | 1.24 | 6,739 | 610 | 1,915 |
| Example 6 | initial wetting | 2.57 | 13,100 | 390 | 1,224 |
| Example 7 | initial wetting | 0.30 | 1,106 | 1,240 | 3,894 |
| Example 8 | initial wetting | 0.80 | 2,949 | 910 | 2,857 |
| Example 9 | initial wetting | 1.40 | 5,160 | 730 | 2,292 |
| Example 10 | initial wetting | 0.60 | 2,920 | 1,110 | 3,486 |
| Example 11 | initial wetting | 0.60 | 2,904 | 770 | 2,418 |
| Comparative Example 1 | — | — | — | 1,900 | 5,967 |
| Comparative Example 2 | washing treatment | — | — | 370 | 1,162 |

Specifically, a solution was prepared by dissolving the cathode active material using hydrochloric acid and hydrogen peroxide. The solution was heated to remove a chlorine gas, cooled to room temperature, and diluted with ultrapure water to prepare a pre-treated sample.

The sample was put into an ICP analyzer (ICP-OES Agilent 5800, Agilent Co.) to emit a light of an inherent wavelength after the sample in an aerosol state was ionized by plasma. Thereafter, the content of a molybdenum component in the sample was quantitatively analyzed by dividing an intensity of the signal obtained through a detector.

(2) Measurement of carbon (C) content.

To measure a carbon content, a C/S analyzer (carbon/sulfur analysis equipment; model name: CS844, manufacturer: LECO) was used, and an amount of the sample was selected according to a range of a measured value of a standard sample when preparing a calibration curve.

Specifically, 0.02 g to 0.04 g of the lithium-transition metal composite oxide particles obtained according to the above-described Examples and Comparative Examples were put into a ceramic crucible, and a combustion accelerator (LECOCEL II) and an IRON chip were also added at a ratio of 1:1.

Thereafter, $O_2$ was supplied as a combustion gas at a rate of 3 L/min from a high-frequency induction furnace to induce a combustion at about 2,600° C. to 2,700° C. A carbon-based inorganic compound gas (e.g., a carbon dioxide gas) generated by the combustion was passed through an infrared detection cell, and a change of infrared absorption compared to a blank was measured to quantitatively determine the carbon content in the lithium-transition metal composite oxide particles.

Figure 6:
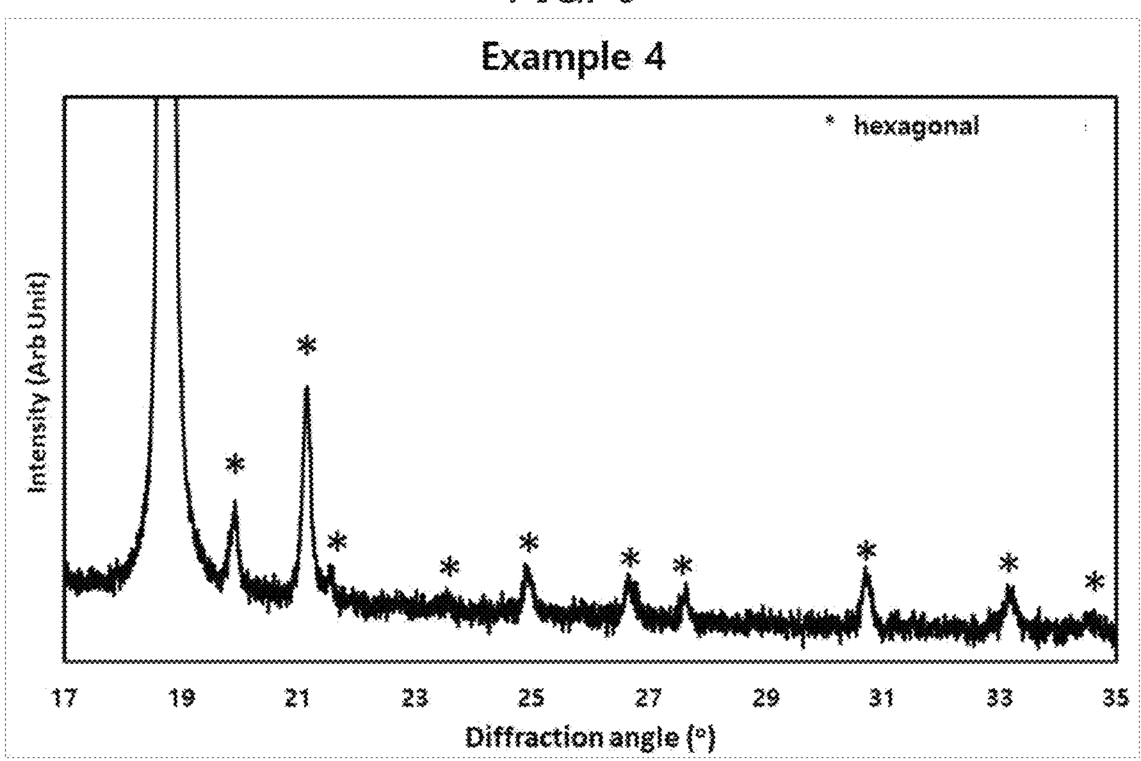
FIGS. 6 and 7 are XRD analysis graphs of lithium-transition metal composite oxide particles according to Example 4 and Comparative Example 2, respectively.
Figure 7:
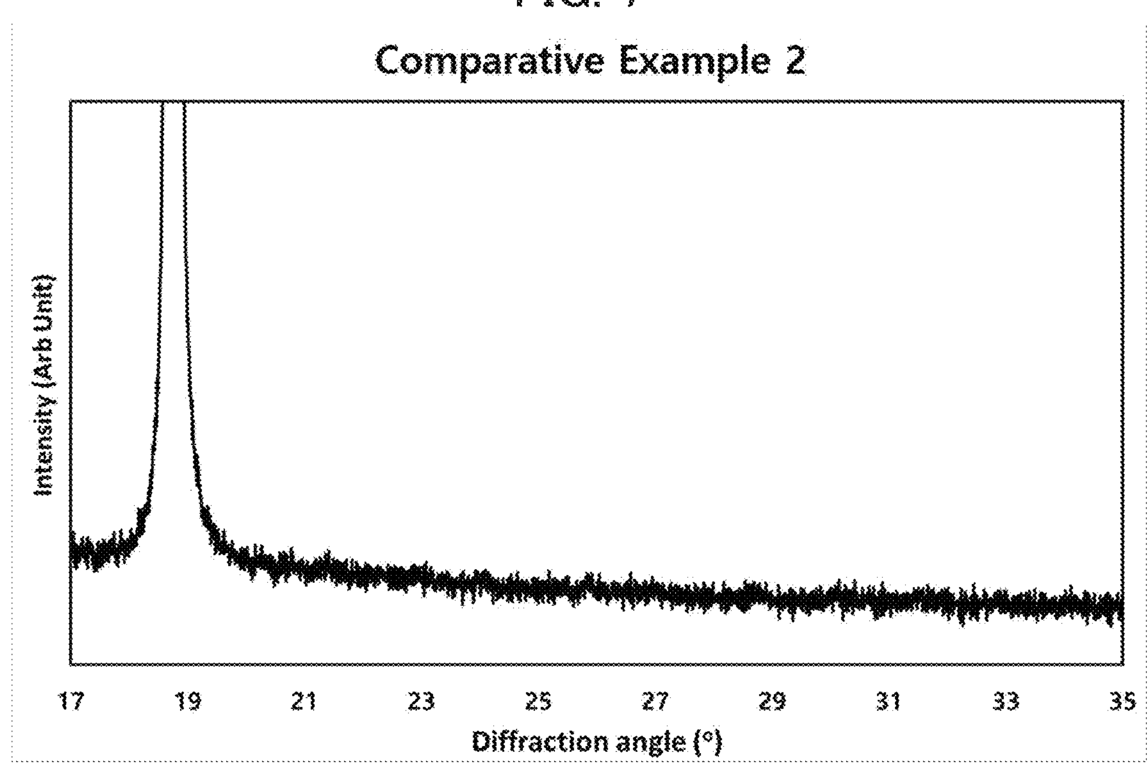

FIGS. 6 and 7 are XRD analysis graphs of lithium-transition metal composite oxide particles according to Example 4 and Comparative Example 2, respectively.

Referring to FIG. 6, in Example 4 where the initial wetting method was performed on the preliminary lithium-transition metal composite oxide particles, hexagonal close-packed structure peaks (*) appeared at a region corresponding to the lithium-molybdenum containing portion (e.g., a region between primary particles).

Referring to FIG. 7, in Comparative Example 2 where the preliminary lithium-transition metal composite oxide particles were washed with water, the hexagonal close-packed structure peak (*) was not generated. Accordingly, a coating having a hexagonal close-packed structure was not formed in the region between the primary particles, and an initial capacity efficiency and capacity retention were degraded as described later with reference to Table 2.

Experimental Example 2

(1) Evaluation on Initial Charge/Discharge Capacity and Initial Capacity Efficiency The lithium secondary battery according to each of Examples and Comparative Examples was charged (CC-CV 0.1 C 4.3V 0.005 C CUT-OFF) in a chamber at 25° C., and then a battery capacity (an initial charge capacity) was measured. The battery was discharged again (CC 0.1 C 3.0V CUT-OFF), and then the battery capacity (an initial discharge capacity) was measured.

An initial capacity efficiency was evaluated by converting the measured initial discharge capacity as a percentage relative to the measured initial charge capacity.

(2) Evaluation of Rate Property

The lithium secondary battery according to each of Examples and Comparative Examples was repeatedly charged (4.3V cut-off) and discharged (2.5V cut-off) at 25° C. to measure a rate property.

Specifically, charging/discharging twice at 0.1 C and charging/discharging once at 0.5 C were performed, and then charging at 0.5 C and discharging at 1 C once, charging at 0.5 C and discharging at 2 C once, and charging at 0.5 C and discharging at 4 C once were performed. The rate properties were evaluated by measuring a C-rate during each charge and discharge.

(3) Measurement of Capacity Retention (Life-Span Property) During Repeated Charging and Discharging For the lithium secondary battery according to each of Examples and Comparative Examples, charging (CC/CV 0.5 C 4.3V 0.05 C CUT-OFF) and discharging (CC 1.0 C 2.5V CUT-OFF) were repeated 100 times. A life-span retention was evaluated as a percentage of the discharge capacity at the 100th cycle by the discharge capacity at the 1st cycle.

The evaluation results are shown in Table 2 below.

TABLE 2

| No. | initial charge capacity (mAh/g) | initial discharge capacity (mAh/g) | initial capacity efficiency (%) | rate property (%) | capacity retention (100 cyc, %) |
|---|---|---|---|---|---|
| Example 1 | 236.0 | 207.8 | 88.1 | 84.7 | 77 |
| Example 2 | 234.3 | 208.6 | 89.1 | 85.0 | 82 |
| Example 3 | 232.2 | 207.5 | 89.4 | 86.1 | 84 |
| Example 4 | 238.3 | 210.9 | 88.5 | 82.4 | 79 |
| Example 5 | 236.6 | 209.9 | 88.7 | 85.6 | 81 |
| Example 6 | 235.8 | 205.5 | 87.2 | 85.3 | 86 |
| Example 7 | 237.5 | 210.7 | 88.7 | 84.1 | 79 |
| Example 8 | 236.4 | 210.4 | 89.0 | 84.7 | 80 |
| Example 9 | 234.9 | 209.8 | 89.3 | 85.1 | 82 |
| Example 10 | 236.0 | 207.4 | 87.9 | 84.3 | 78 |
| Example 11 | 235.7 | 205.1 | 87.0 | 84.2 | 79 |
| Comparative Example 1 | 237.2 | 207.8 | 87.6 | 77.1 | 67 |
| Comparative Example 2 | 236.4 | 203.0 | 85.9 | 84.0 | 72 |

Referring to Tables 1 and 2, the cathode active materials of Examples in which the initial wetting method was performed by mixing the molybdenum compound aqueous solution generally had a reduced content of the residual lithium compared to those from the cathode active materials of Comparative Examples. The lithium secondary batteries of Examples provided improved initial capacity efficiencies and life-span properties compared to those from the lithium secondary batteries of Comparative Examples.

In Comparative Example 1, the residual lithium was not removed because both the initial wetting method and the water-washing treatment were not performed. Accordingly, the capacity retention of the lithium secondary battery of Comparative Example 1 was reduced by 10% to 19% compared to those from the lithium secondary batteries of Examples.

In Comparative Example 2, the residual lithium was removed by the water-washing treatment, but the initial capacity properties of the lithium secondary battery was deteriorated due to deformation of the particle structure. Further, the lithium-molybdenum-containing portion did not protect the primary particles, and thus the capacity retention was reduced by 5% to 14% compared to those from the secondary batteries of Examples.

In Example 6, the input amount of the ammonium molybdenum-based compound exceeded 7,000 ppm, resulting in lower initial capacity properties than those from other Examples.

In Example 7, the input amount of the ammonium molybdenum-based compound was less than 1,200 ppm, the C content and $Li_2CO_3$ content were measured as being relatively high compared to those from other Examples.

In Example 10, the amount of the solvent in the molybdenum compound aqueous solution was less than 2 wt % based on the total weight of the preliminary lithium-transition metal composite oxide particles, and the residual lithium removal was relatively lowered compared to those from other Examples.

In Example 11, the amount of the solvent in the molybdenum compound aqueous solution exceeded 20 wt % based on the total weight of the preliminary lithium-transition metal composite oxide particles, and the initial capacity and life-span properties were relatively degraded compared to those from other Examples.

Figure 8:
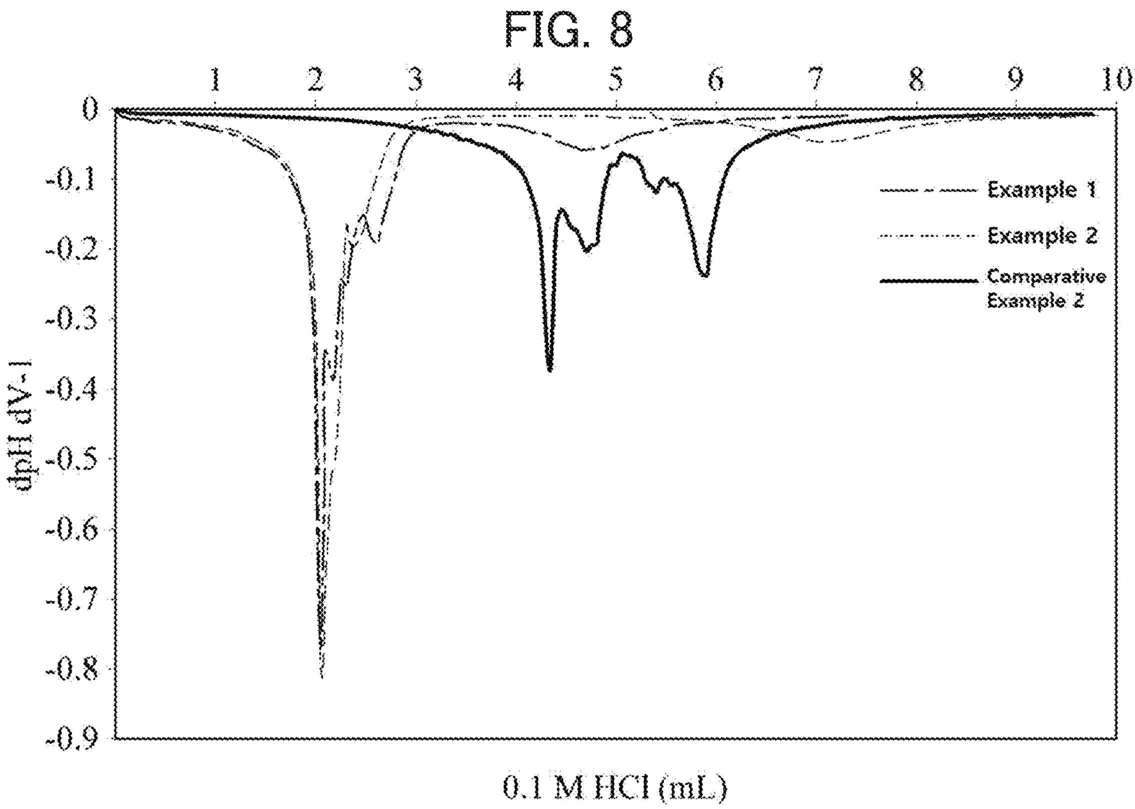
FIG. 8 is a graph showing a pH change according to an input amount of HCl when titrating cathode active materials of Examples 1 and 2 and Comparative Example 1 with 0.1 M HCl.

FIG. 8 is a graph showing a pH change according to an input amount of HCl when titrating cathode active materials of Examples 1 and 2 and Comparative Example 1 with 0.1 M HCl. Specifically, FIG. 8 is a graph in which a y-axis was set as the pH change relative to the HCl input volume (dpH/dV) and an x-axis was set as the HCl input volume while adding 0.1 M HCl to the cathode active materials of Examples 1 and 2 and Comparative Example 1.

Referring to FIG. 8, in Examples 1 and 2, the titration was completed when about 3 mL of HCl was added. In Comparative Example 1, the titration was completed when about 7 mL of HCl was added.

In Examples 1 and 2, the residual lithium was removed by the molybdenum compound and the amount of the residual lithium to be titrated was reduced compared to that in Comparative Example 1. Accordingly, the volume of 0.1 M HCl required for the titration was reduced.

What is claimed is:

1. A cathode active material for a lithium secondary battery comprising a plurality of a lithium-transition metal composite oxide particle having a shape of a secondary particle in which primary particles are aggregated, wherein the lithium-transition metal composite oxide particle comprises a lithium-molybdenum-containing portion having a hexagonal close-packed structure is formed between the primary particles having a hexagonal close-packed structure within an inner region of the secondary particle.

2. The cathode active material for a lithium secondary battery according to claim 1, wherein the lithium-transition metal composite oxide particle does not include primary particles having a face centered cubic structure.

3. The cathode active material for a lithium secondary battery according to claim 1, wherein a content of molybdenum in the lithium-transition metal composite oxide particle measured through an inductively coupled plasma (ICP) analysis is in a range from 1,000 ppm to 14,000 ppm based on a total weight of the lithium-transition metal composite oxide particle.

4. The cathode active material for a lithium secondary battery according to claim 3, wherein the content of molybdenum in the lithium-transition metal composite oxide particle measured through the ICP analysis is in a range from 1,200 ppm to 7,000 ppm based on the total weight of the lithium-transition metal composite oxide particle.

5. The cathode active material for a lithium secondary battery according to claim 1, wherein a carbon content remaining on an outer surface of the lithium-transition metal composite oxide particle and between the primary particles measured by a CS (carbon-sulfur) analyzer is 1,200 ppm or less.

6. The cathode active material for a lithium secondary battery according to claim 1, wherein the lithium-molybdenum-containing portion is further present on an outer surface of the lithium-transition metal composite oxide particle.

7. A lithium secondary battery, comprising:

a cathode comprising a cathode active material layer, the cathode active material layer comprising the cathode active material for a lithium secondary battery of claim 1; and an anode facing the cathode.

8. A method of preparing a cathode active material, comprising:

preparing preliminary lithium-transition metal composite oxide particles each having a shape of a secondary particle in which a plurality of primary particles are aggregated;

mixing the preliminary lithium-transition metal composite oxide particles with a molybdenum compound aqueous solution; and heat-treating the mixed preliminary lithium-transition metal composite oxide particles and the molybdenum compound aqueous solution to form lithium-transition metal composite oxide particles comprising a lithium-molybdenum containing portion formed between the primary particles within an inner region of the secondary particle, the lithium-molybdenum containing portion and the primary particles having a hexagonal close-packed structure.

9. The method of claim 8, wherein the molybdenum compound aqueous solution comprises an ammonium molybdenum-based compound represented by Chemical Formula 2:

$$(NH_4)_aMo_bA_c \quad \text{[Chemical Formula 2]}$$

wherein, in Chemical Formula 2, A represents O or S, $2 \leq a \leq 10$, $1 \leq b \leq 10$, and $4 \leq c \leq 30$.

10. The method of claim 9, wherein the ammonium molybdenum-based compound includes at least one of ammonium orthomolybdate ($(NH_4)_2MoO_4$), ammonium heptamolybdate ($(NH_4)_6Mo_7O_{24}$) and ammonium tetrathiomolybdate ($(NH_4)_2MoS_4$).

11. The method of claim 9, wherein an input amount of the ammonium molybdenum-based compound is in a range from 0.4 wt % to 2.5 wt % based on a total weight of the preliminary lithium-transition metal composite oxide particles.

12. The method of claim 8, wherein an amount of a solvent in the molybdenum compound aqueous solution is in a range from 2 wt % to 20 wt % based on a total weight of the preliminary lithium-transition metal composite oxide particles.

13. The method of claim 8, wherein the heat-treating is performed at a temperature ranging from 200° C. to 400° C.

14. The method of claim 8, wherein the preliminary lithium-transition metal composite oxide particles are mixed with the molybdenum compound aqueous solution without a water-washing treatment.

* * * * *